Aug. 2, 1960
A. LENTZ
2,947,457
VEHICLE SPRING-AWAY GARMENT HANGER HOOK
Filed May 15, 1959
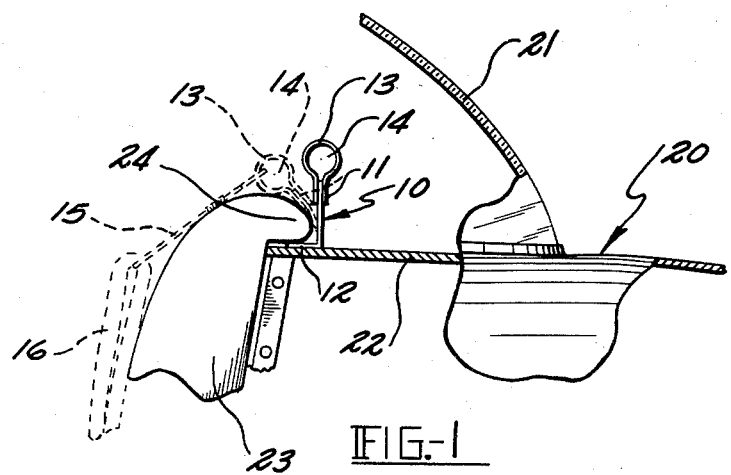
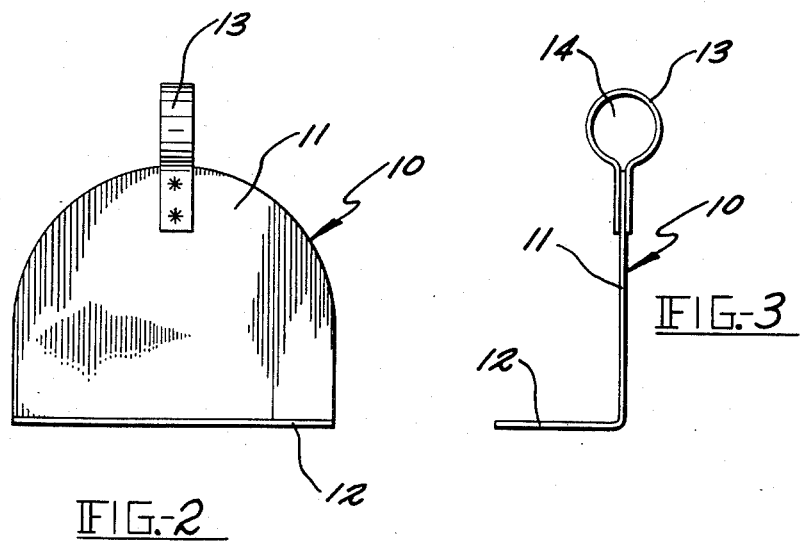
INVENTOR
ARTHUR LENTZ
BY Herbert A. Newton
ATTORNEY

United States Patent Office 2,947,457
Patented Aug. 2, 1960

2,947,457

VEHICLE SPRING-AWAY GARMENT HANGER HOOK

Arthur Lentz, 2048 Cold Spring Road, Indianapolis 2, Ind.

Filed May 15, 1959, Ser. No. 813,389

1 Claim. (Cl. 224—29)

This invention relates to a device which is adapted to be carried selectively along the upper portion of an automobile rear seat member in order that garment hangers and the like may be engaged therewith to suspend the items carried thereby down over the rear seat.

The primary object of the invention is to provide a structure which may be readily attached to a vehicle without the use of any tools and the like, the device being easily and quickly fixed in position by merely slipping a portion thereof inwardly between a seat upper edge and a rear window deck member lying therebelow.

A further important object of the invention resides in its flexible construction, carrying the garments loosely over the seat member to freely shift in respect thereto when the vehicle is suddenly stopped or started or rough roads are being traveled. With such a construction, the garments carried by the various hangers do not become unnecessarily creased as usual when they remain in one position for any length of time. The free moving garments, shifting in respect to the seat member, allow air to enter therebetween and eliminate the tendency of the items to adhere to the seat proper and thereby become creased.

A still further important object of the invention is to provide a structure which is readily available for use but which, when not in use, springs to a position away from the seat member enabling the full area thereof to be used by passengers and the like without any obstruction whatsoever. In like manner, the size and shape of the device is such that full vision through the vehicle rear window is available to the operator at all times.

These and other objects and advantages of the invention including the low cost of production and simplicity in design, will become apparent to those versed in the art in the following description of one particular form of the invention as illustrated in the accompanying drawing, in which:

Fig. 1 is a fragmentary view in section of a rear portion of an automobile with the invention applied thereto;

Fig. 2 is a view in front elevation of the device; and

Fig. 3 is a view in side elevation of the device.

A fragmentary rear portion of an automobile generally designated by the numeral 20 has the usual rear window glass member 21 and a deck member 22 extending from a lower edge of the glass 21 forwardly to abut a rear seat member 23. The seat member 23 in this instance extends by an upper portion 24 over the forward edge of the deck member 22, this edge 24 lying adjacent the member 22 and being resilient to the extent that it may be forced a spaced distance from the deck member.

The hanger hook constituting the invention as shown in Figs. 2 and 3, consists of a resilient body member 10 generally, being in the form of an L and having a leg 11 extending upwardly from an inturned foot 12. As shown in Fig. 2, this leg 11 is arcuately shaped and has a length approximately two times that of the inturned foot 12. The leg 11 fixedly carries a centrally disposed and upwardly extending eye or hook member 13. This member 13 may be fixed to the leg 11 in any manner, such as by bolts, rivets, or spot welding it thereto as herein shown. The essential characteristic of the member 13 is that its opening 14 be located above the upper peripheral edge of the leg 11.

In operation, the device is attached to the vehicle as shown in Fig. 1 wherein the inturned foot 12 is forced inwardly between the seat upper portion 24 and the deck member 22 with the leg 11 extending upwardly therefrom to carry the hook member 13 thereabove. In positioning the device as above described, the leg 11 may be located at spaced distance rearwardly of the seat edge 24 as shown in Fig. 1, or may be positioned to abut the seat. As above set out, the body member 10 is made of a resilient material and the upstanding leg 11 will regain its initial position in relation to the foot 12 after any stress applied thereto and flexing it one way or another is removed. After the device is so positioned in the vehicle as shown by the solid lines in Fig. 1, a garment hanger, or any number thereof, may be engaged with the hook member 13 in the usual manner in order that the items of clothing carried thereby may be suspended down over the front surface of the vehicle rear seat member 23. As shown by the dash lines in Fig. 1, upon the engagement of a hanger 15 carrying items of clothing 16 with the hook member 13, the weight of the clothing carried thereby bends the upstanding leg 11 forwardly over the seat upper edge 24 to effectively carry the items of clothing in the manner as shown. In view of the fact that the body member 10 is made of a resilient material, upon the removal of the hanger 15 from the hook member 14, the leg 11 will spring rearwardly to its initial position in relation to the fixed foot 12 and thereby be located without tending to obstruct in any manner the normal use of the full area of the rear seat.

The leg 11 while carrying garments and positioning them in the manner as shown by the dash lines, will continue to flex and spring in accordance with the movement of the vehicle in order that the garments carried thereby will not be jostled off of their carrying hanger even under extremely rough motoring. In order to provide such a resilient body member, it is feasible to use any one of the many materials which may be formed but will retain its initial flexibility, such as steel, aluminum, or even one of the many plastic materials on the market.

As shown in Fig. 1, the length of the flexible leg 11 is such that the hook member 13 is disposed only a short distance above the seat upper edge portion 24 when not in use. Upon engagement of hangers 15 and the like, the leg 11 yieldingly bends downwardly and forwardly over the seat portion 24 to position the hook member 13 in contact therewith while carrying the garments 16 loosely over the front surface of the seat 23. In view of the overall size of the invention, it is easily seen that no obstruction is placed in the driver's line of vision when looking through the rear window 21. A clear line of vision is available to the driver at all times, both in the garment carrying position as shown by dash lines and in its free position as shown by the solid lines, Fig. 1. For illustrative purposes only, and without tending to limit the invention to such, the leg 11 may be approximately four inches in length and five inches in width, the foot 12 extending along the width of the leg 11 may be approximately two inches in length, and the hook member 13 may be approximately one-half of an inch in width and extend approximately one and one-half inches above the leg 11.

In view of the foregoing description of one particular form of the invention, it is seen that I have provided a very simple, yet most effective structure for the purposes indicated, and although it is obvious that structural changes may be made without departing from the spirit

I claim:

For supporting a garment hanger carrying a garment thereon hanging downwardly over a vehicle seat back, the combination with a deck member and a seat back having an upper end portion overlapping and bearing in part over said deck, of a garment hanger carrying means comprising a plate serving as a foot resting on said deck and entered between the deck and said seat back portion; a leg of resilient material extending upwardly from said foot and said back portion and terminating in a ring member spaced above said back portion; said leg resiliently bending over said back portion under the weight of said hanger and garment thereon and flexing up and down under shaking and vibration of the vehicle under driving conditions.

References Cited in the file of this patent

UNITED STATES PATENTS

| | | |
|---|---|---|
| 2,061,302 | Egler | Nov. 17, 1936 |
| 2,196,196 | Dorsey | Apr. 9, 1940 |
| 2,582,650 | Patton | Jan. 15, 1952 |
| 2,708,062 | Poyer | May 10, 1955 |

FOREIGN PATENTS

| | | |
|---|---|---|
| 1,021,590 | France | Dec. 3, 1952 |
| 1,148,425 | France | June 24, 1957 |